May 12, 1925.
T. J. KING
SIGNAL DEVICE
Filed Dec. 17, 1923
1,537,311
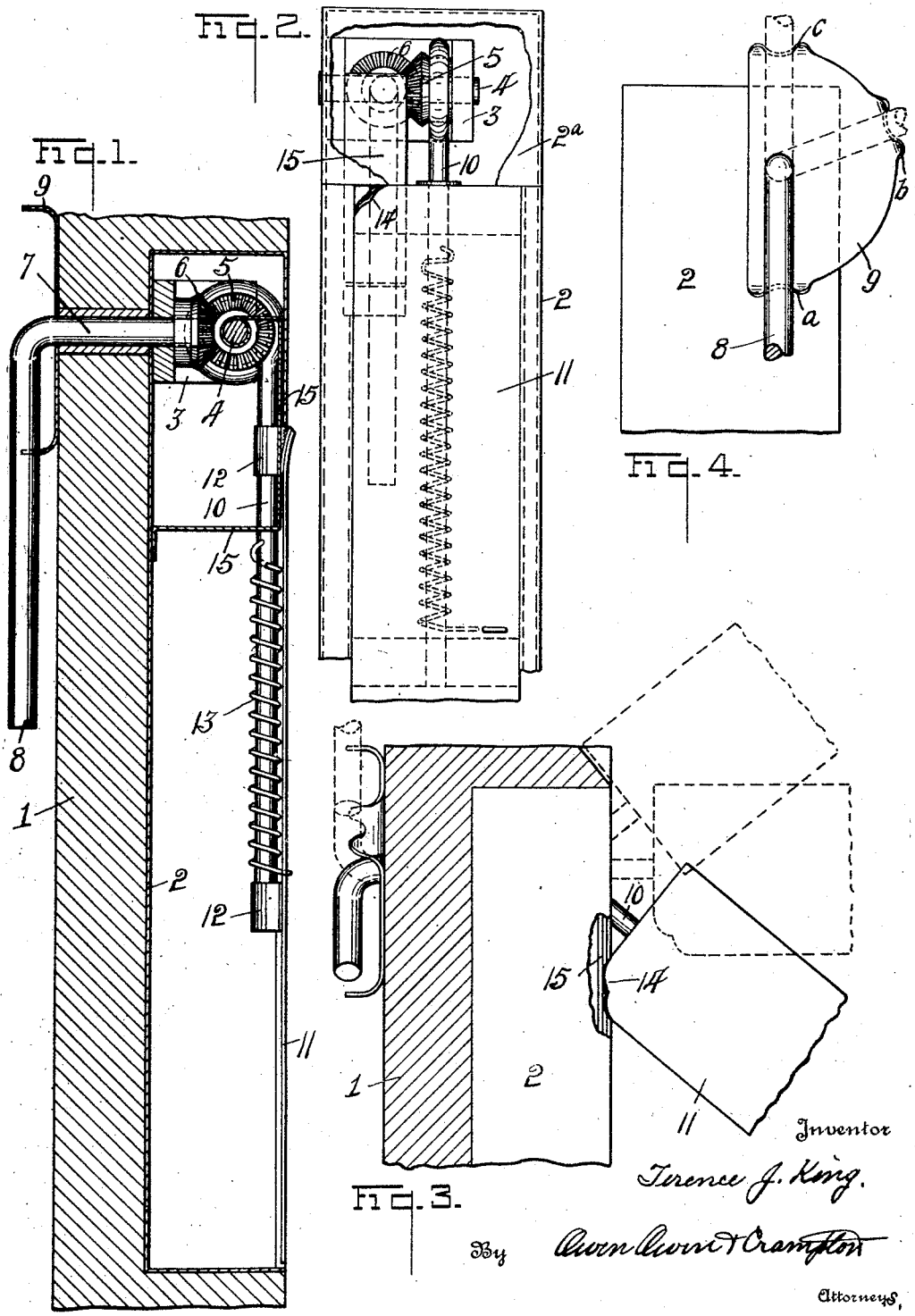
Inventor
Terence J. King.
By Owen Owen & Crampton
Attorneys Patented May 12, 1925.

1,537,311

UNITED STATES PATENT OFFICE.

TERENCE J. KING, OF TOLEDO, OHIO, ASSIGNOR OF ONE-HALF TO CLARENCE S. ORDWAY, OF TOLEDO, OHIO.

SIGNAL DEVICE.

Application filed December 17, 1923. Serial No. 681,221.

*To all whom it may concern:*

Be it known that I, TERENCE J. KING, a citizen of the United States, and a resident of Toledo, in the county of Lucas and State of Ohio, have invented a new and useful Signal Device, which invention is fully set forth in the following specification.

This invention relates to signal devices and particularly to those adapted for use on automobiles to signal the stopping or the direction of turning of the vehicle.

The object of the invention is the provision of a mechanical device of this character having an arm at the side of the vehicle operable from within the vehicle and movable into inoperative and into one or more signalling positions, and adapted when in inoperative position to stand substantially flush with the vehicle side in folded or unobstructing position.

Further objects and advantages of the invention will be apparent from the following detailed description.

While the invention is capable of embodiment in numerous forms, a preferred embodiment thereof is illustrated in the accompanying drawings, in which, Figure 1 is a vertical section through a portion of an automobile body and through a means embodying the invention, with parts of the latter in full and with its signal arm in inoperative position. Fig. 2 is a fragmentary face view of the device embodying the invention and of the casing enclosing the same with parts broken away, and with the signal arm in inoperative position. Fig. 3 is a fragmentary vertical section of the body frame with the invention associated therewith, with parts broken away, and with the signal arm shown in full line in one signalling position and in dotted lines in two other signalling positions, and Fig. 4 is a fragmentary elevation of the control portion of the device and of a frame part with which it is associated.

Referring to the drawings, 1 designates a body frame part of an automobile or other vehicle disposed at a side of the vehicle and having a recess on its outer side into which a casing or housing 2 is set with its outer side open and flush, or substantially so, with the outer side of the vehicle body.

An angled bearing bracket 3 is mounted within one end portion of the casing 2, at its upper end portion in the present instance, and one end of the shaft 4 is journaled in the outstanding arm of the bracket while its other arm is journaled in one of the sides of the casing. A bevel-gear 5 is fixed to said shaft and is in mesh with and driven by a companion bevel-gear 6, which is carried at the inner end of a shaft 7, mounted in the reclining portion of the bracket 3 and in a bearing in the frame member 1, and has one end disposed within the vehicle in convenient reach of the driver and provided with a crank-arm 8 to facilitate a turning thereof. The crank-arm 8 has spring engagement with a sector member 9 secured to the frame 1 within the vehicle and is yieldingly held by said plate in three different positions by yielding seats *a*, *b* and *c*, provided in the outstanding edge portion of the plate, as shown in Fig. 4.

An arm 10 is fixed at its inner end to the bevel-gear 5 to have turning movements therewith, and such turning movements, due to the horizontal positioning of the shaft 4, are caused to swing the arm throughout a vertical arc, the arm when at the limit of its downward swinging movement standing within the casing 2. The arm 10 carries a plate 11 lengthwise thereof and for turning movements thereon around the longitudinal axis of the arm, the plate having in the present instance two bearings 12 through which the arm rotatably projects. A tension spring 13 encircles the arm 10, having one end fixed to the arm and its other end fixed to the plate 11 and acts on the plate to cause the plate to normally stand with its face in a vertical plane, which is transverse to the vehicle and to the swinging axis of the arm, as shown in the full line position of the plate in Fig. 3. When the arm 10 is swung to its inoperative position within the case 2 and is in substantially the same position as shown in full lines in Fig. 3, the upper inner corner 14 of the plate, which is preferably curved for the purpose, strikes a bracket 15 within the casing 2 and causes the plate during its continued movement to inoperative position to have a quarter turn about the arm so that its face is shifted from a vertical plane transverse to the shaft 4 to a plane parallel or substantialy so with said shaft. By this means the movement of the arm 10 into the case 2 causes the arm to turn from displaying position to inoperative position within the outer portion of the case 12 in closing relation thereto and preferably substantially flush with the outer side of the car body. This prevents the signal plate or arm from projecting beyond the side of the vehicle body when in inoperative position. Upon an outward swinging of the arm 10 the spring 13 acts on the plate to turn it to operative position with respect to the arm, and the plate and arm are caused to swing together to place the plate in any one of the different signalling positions for which it is adapted.

It is customary in traffic signalling to extend an arm in a downwardly inclined direction when it is intended to stop the vehicle; to extend an arm straight out in a horizonal direction when it is intended to turn to the left; to extend an arm in an upwardly inclined direction when it is intended to turn to the right, these three positions being indicated in Fig. 3. The signal arm or plate is yieldingly held in its inoperative position, as shown in Figs. 1 and 2, by the engagement of the crank 8 with the yielding sector seat *a*, and is held in the horizontal and in the upwardly inclined positions shown in Fig. 3 by the engagement of the crank arm with the seats *b* and *c*, respectively. When the plate is in the full line signal position shown in Fig. 3 it is supported in such position by reason of its corner 14 resting against the bracket 15.

It is preferable to have the plate 11 correspond to the shape and size of the outer side opening of the casing 2 so that when the plate is in the inoperative position shown in Figs. 1 and 2, it will substantially fill and close said opening. The outer side portion 2ª of the casing 2, which covers the shaft 4 and bevel gears is provided with a slot (not shown) through which the arm 10 may swing to its different signalling positions.

It is evident that I have provided a simple and efficient signal device of the manually controlled mechanical type, which is entirely enclosed within a casing part when in inoperative position, and that the flat signal arm portion thereof automatically turns from an inoperative position, which is substantially flush with the car side, to an operative position which is at right angles to the car side when the arm is swung outward, and vice versa.

I wish it understood that my invention is not limited to any specific construction, arrangement or form of the parts, as it is capable of embodiment in numerous forms without departing from the spirit of the claims.

Having thus described my invention, what I claim as new, and desire to secure by Letters Patent, is,—

1. In combination with the side of a vehicle body and a casing embedded therein, a shaft journaled in the vehicle body side and having a crank arm disposed within the body, a bevel gear on the shaft disposed within the casing, a bracket in the housing, a shaft journaled in the bracket and disposed at right angles to the first named shaft, a bevel gear on the second shaft in mesh with the first named gear, an arm fixed to the second shaft and movable into and out of the casing, a spring tensioned signal plate rotatable on the arm and having a curved inner corner, and a bracket in the casing formed to engage the said curved corner of the signal plate to rotate the latter on the arm upon movement of the arm to inoperative position.

2. In combination with the sides of a vehicle body having a chamber opening through the outer face of said side, an arm, means to mount the arm for movement into and out of the chamber, a signal plate of a size to form a cover for the chamber rotatable on the arm, spring means for moving the plate to lie at right angles to the plane of said body side when the arm is out of the chamber, means in the chamber to move the plate to lie in the plane of the body side and to close the chamber when the arm is moved to inoperative position, and means to move the arm into and out of the chamber.

3. In combination with the side of a vehicle body having a chamber opening through the outer face of the said side, an arm, means to mount the arm for movement into and out of the chamber, a signal plate of a size to form a cover for the chamber rotatable on the arm, spring means for moving the plate to lie at right angles to the plane of said body side when the arm is out of the chamber, said plate having a curved inner corner, a bracket in the chamber to engage said inner corner of the plate and to hold the latter in the plane of the body side when the arm is moved to inoperative position, and means to move the arm into and out of the chamber.

4. In a vehicle signal device, a signal plate, means to rotatably support the plate and to bodily move same toward and away from the vehicle, means to automatically turn the plate to lie at right angles to the plane of a side of the vehicle upon movement of the arm to operative position, means to actuate the arm to cause same and the plate to occupy various inclinded signalling positions when the arm and the plate are in operative position, and means to automatically effect movement of the plate to lie in the plane of the vehicle side upon movement of the arm to inoperative position.

In testimony whereof I have hereunto signed my name to this specification.

TERENCE J. KING.